United States Patent
Hirman et al.

(10) Patent No.: US 11,209,812 B2
(45) Date of Patent: Dec. 28, 2021

(54) METHODS AND SYSTEMS FOR TRACKING MILLING ROTOR BIT WEAR

(71) Applicant: Caterpillar Paving Products Inc., Brooklyn Park, MN (US)

(72) Inventors: Colton J. Hirman, Maple Grove, MN (US); Dustin W. Sondreal, Hanover, MN (US); Eric S. Engelmann, Delano, MN (US)

(73) Assignee: Caterpillar Paving Products Inc., Brooklyn Park, MN (US)

( * ) Notice: Subject to any disclaimer, the term of this patent is extended or adjusted under 35 U.S.C. 154(b) by 128 days.

(21) Appl. No.: 16/787,004

(22) Filed: Feb. 10, 2020

(65) Prior Publication Data

US 2021/0247756 A1   Aug. 12, 2021

(51) Int. Cl.
| | |
|---|---|
| G05B 23/02 | (2006.01) |
| G07C 3/08 | (2006.01) |
| G01N 3/56 | (2006.01) |
| G05B 13/02 | (2006.01) |

(52) U.S. Cl.
CPC .......... *G05B 23/0283* (2013.01); *G01N 3/56* (2013.01); *G05B 13/0265* (2013.01); *G07C 3/08* (2013.01)

(58) Field of Classification Search
CPC ............... G05B 23/02; G05B 23/0283; G05B 13/0265; G07C 3/08; G01N 3/56
See application file for complete search history.

(56) References Cited

U.S. PATENT DOCUMENTS

| | | | |
|---|---|---|---|
| 7,847,679 B2* | 12/2010 | Copeland | F16D 13/64 340/454 |
| 7,959,071 B1* | 6/2011 | Crews | G06Q 40/02 235/379 |
| 9,488,467 B2 | 11/2016 | PallikkaraGopalan | |
| 10,138,067 B2* | 11/2018 | Anderson | B65G 19/08 |
| 10,371,669 B2* | 8/2019 | Plouzek | E02F 9/2883 |
| 10,378,891 B2* | 8/2019 | Franke | G01B 11/24 |
| 10,416,056 B2 | 9/2019 | Paulsen | |
| 10,578,590 B2* | 3/2020 | Plouzek | G01N 17/006 |
| 2006/0042734 A1* | 3/2006 | Turner | B60C 11/24 152/154.2 |
| 2006/0246275 A1* | 11/2006 | Dumm | C23C 30/00 428/323 |
| 2013/0297231 A1 | 11/2013 | Puzz | |
| 2019/0136650 A1 | 5/2019 | Zheng | |
| 2020/0132431 A1* | 4/2020 | Anderson | G01L 1/20 |
| 2021/0042907 A1* | 2/2021 | Campomanes | E02F 9/267 |
| 2021/0215478 A1* | 7/2021 | Hoffmann | B02C 23/00 |

FOREIGN PATENT DOCUMENTS

| | | |
|---|---|---|
| CN | 104117876 B | 8/2018 |
| CN | 108932712 A | 12/2018 |
| WO | WO2019081543 A1 | 5/2019 |
| WO | WO2019087213 A1 | 5/2019 |

* cited by examiner

*Primary Examiner* — Tung S Lau

(74) *Attorney, Agent, or Firm* — Lee & Hayes, PLLC

(57) ABSTRACT

A method for determining part wear, such as using a wear model, includes receiving, from a sensor, sensor data representing a surface of a wear part. The method further includes determining an estimated time until the part should be replaced. The method further includes batching together multiple wear parts that need replacing to enable a user to replace multiple parts in one maintenance period. The method may also include providing information to the user during replacement of a worn part to indicate the part location.

20 Claims, 6 Drawing Sheets

METHODS AND SYSTEMS FOR TRACKING MILLING ROTOR BIT WEAR

TECHNICAL FIELD

The present disclosure relates generally to tracking milling rotor bit wear and, more particularly, to systems and methods for determining part wear based upon one or more sensor data of a used or worn part.

BACKGROUND

To facilitate earth working activities (e.g., mining, construction, dredging, or the like), machines are often outfitted with ground-engaging tools. For instance, tools including but not limited to teeth, picks, spikes, shrouds, and/or lips may be commonly provided to protect underlying equipment from undue wear and/or to perform other functions. By way of non-limiting example, a road milling machine, for example, cold planer may be provided with a mill outfitted with teeth to contact the ground and break up or dislodge materials to a desired depth. During use, such ground-engaging tools can encounter heavy loading and/or highly abrasive conditions. These conditions cause the ground-engaging tools to become worn and, eventually, to wear out or fail. Excessive wear can result in breakage and/or loss of the ground-engaging tools, which can result in decreased productivity, increased costs in repair and/or maintenance, and other problems. Accordingly, it may be desirable to monitor part wear, e.g., to understand and/or quantify wear part including to replace parts prior to failure.

Systems have been designed with a view toward attempting to determine wear associated with a part. For example, U.S. Pat. No. 8,386,196 to Wagner et al. ("the '196 Patent") describes systems and methods for determining part wear using a contactless measurement method. For instance, the '196 patent describes capturing digital images using a camera and light source determining distances of wear surfaces of the imaged part from a surface of an unworn part and/or a spent/worn part. For example, the technique uses triangulation of the light and the camera with respect to the part to determine the distance of wear surfaces of the imaged part from a surface of an unworn part. In some examples, the system described in the '196 patent, may determine the degree of wear based on these distances.

While the system described in the '196 patent may quantify wear, the distances calculated according to the techniques described therein may not accurately reflect wear patterns. For instance, wear can occur irregularly at different surfaces, and the techniques described in the '196 patent may not account properly for such wear. By way of non-limiting example, the techniques described in the '196 patent may measure distances other than in the direction of wear, thereby returning an inaccurate wear determination.

The present disclosure is directed to one or more improvements in the existing technology.

SUMMARY

One aspect of the disclosure is directed to a system including one or more processors, and computer-readable media storing instructions that, when executed, cause the one or more processors to perform acts. The acts may include receiving information associated with a wear surface of a part, sending the information associated with the wear surface of the part to a wear processing system, receiving, from the wear processing system, the wear processing system having determined based at least in part on the information, that the part should be replaced, an indication that the part should be replaced. The acts may also include causing a notice indication to be displayed indicating that the part should be replaced, causing the part to move to a replacement orientation for replacement, and causing an indication to be visible to an operator indicating which part of a plurality of parts is the part that should be replaced.

Another aspect of the disclosure is directed to a computer implemented method including receiving information associated with a wear surface of a part. The method may also include sending the information associated with the wear surface of the part to a wear processing system, and receiving an indication that the part should be replaced. The indication may be from the wear processing system where the wear processing system determined that the part should be replaced based at least in part on the information sent to it. The method may also include causing a notice indication to be displayed indicating that the part should be replaced, causing the part to move to a replacement orientation for replacement, and causing an indication to be visible to an operator indicating which part of a plurality of parts is the part that should be replaced.

Another aspect of the disclosure is directed to construction equipment, for example, surface or road milling machines, cold planer machines, asphalt mills, pavement planers, roto-mills, rotary mixers, among others, that include a part having a wear surface, one or more processors, and computer-readable media storing instructions that, when executed, cause the one or more processors to perform acts. The acts may include receiving information associated with the wear surface of the part and sending the information associated with the wear surface of the part to a wear processing system. The acts may also include receiving, from the wear processing system an indication that the part should be replaced. The indication may be from the wear processing system where the wear processing system determined that the part should be replaced based at least in part on the information. The acts may also include causing a notice indication to be displayed indicating that the part should be replaced, causing the part to move to a replacement orientation for replacement, and causing an indication to be visible to an operator indicating which part of a plurality of parts is the part that should be replaced.

DETAILED DESCRIPTION

Figure 1:
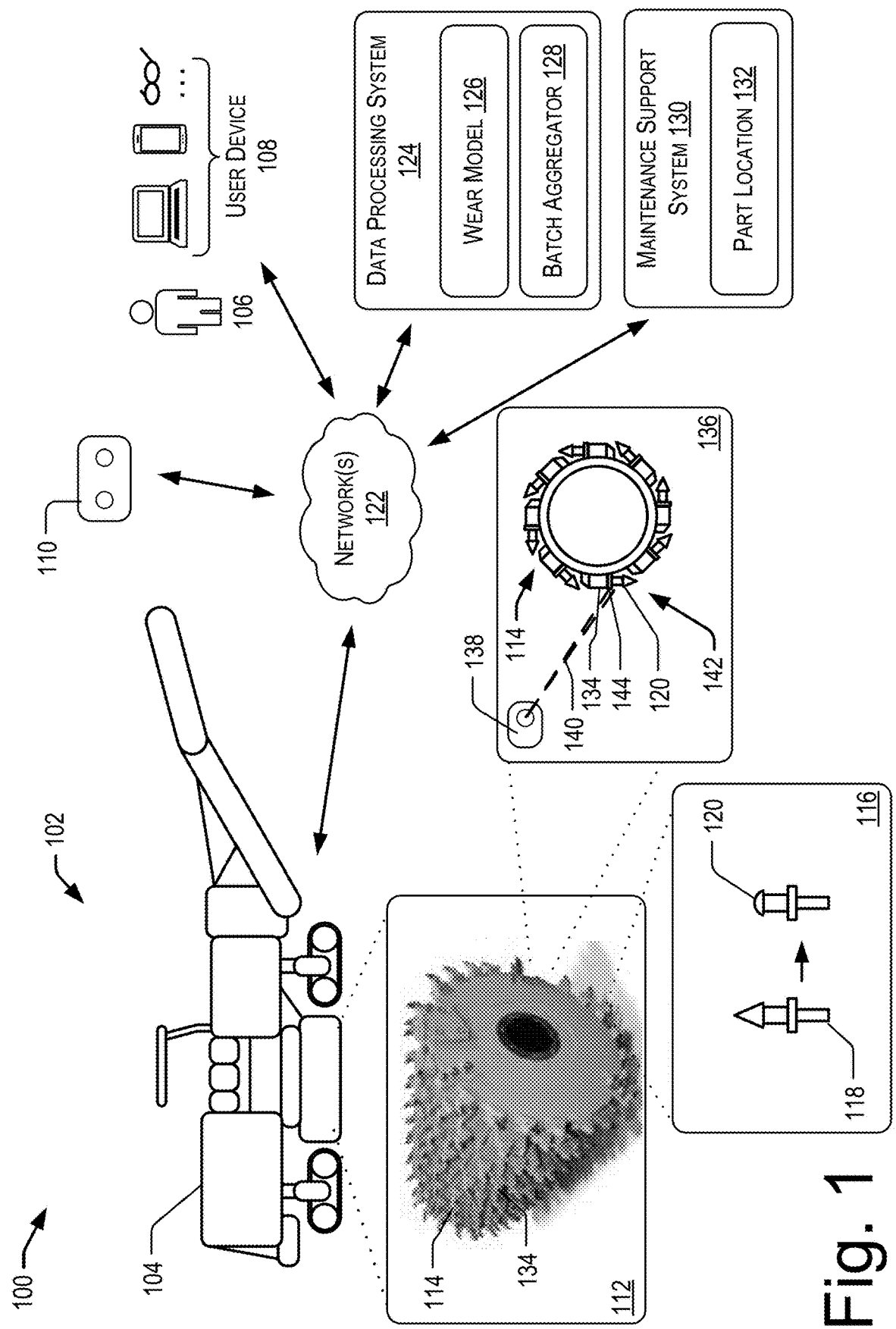
FIG. 1 is a representation of an exemplary environment for determining part wear and facilitating replacement according to aspects of this disclosure.

This disclosure generally relates to methods, systems, and techniques for determining when to replace parts based on wear. While specific parts described herein may be parts on machines, e.g., ground-engaging machines, earth-moving machines, or the like, the techniques described herein may be applicable to any number of parts that wear over time, e.g., from abrasion, corrosion, or the like. Where possible, the same reference numerals are used through the drawings to refer to the same or like features.

FIG. 1 illustrates an example environment 100 for determining part wear based on sensor or image data of the part, according to implementations of this disclosure. Components of the environment 100 may interact with each other to enable a user (e.g., a machine operator, site manager, or the like) to easily determine the degree of wear of a machine part based on sensor data (e.g., data captured using an imaging sensor, for example, an optical sensor) associated with the part. As illustrated, the environment 100 can include a job or worksite 102 at which a machine 104 is performing one or more functions, including but not limited to construction equipment, such as, for example, surface or road milling machines, cold planer machines, asphalt mills, pavement planers, roto-mills, rotary mixers, among others that provide earth-moving, or excavating functions. The worksite 102 can also include a user 106, a user device 108 associated with the user, and/or an imaging sensor 110, which may also be associated with (or operated by) the user 106. The worksite 102 may represent any location at which the machine 104 and/or the user 106 may be present. For example, and without limitation, the worksite 102 can include a machine site, a repair shop, a dealership, a residence, a mine, a quarry, a highway or road, or the like. As detailed further herein, the user 106 may capture sensor data, e.g., point cloud data representative of a part and/or image data of the part, at the worksite 102 using the sensor 110, which may be incorporated into the user device 108, into the machine 104, or combinations thereof (although in some examples the sensor 110 or imager may be separate from the user device 108 and/or machine 104).

The machine 104 may be one of any of a variety of machines, but generally includes a machine having one or more parts that are susceptible to wear, e.g., resulting from forces acting on such parts during operation of the machine 104, and must be replaced over time as a result of such wear. The machine 104 is illustrated as a cold planer which may have teeth or picks secured to a mill assembly drum, mill, drum, or combinations thereof among others (for convenience hereinafter mill). For instance, an enlarged view 112 accompanying the depiction of the machine 104 shows a mill 114 fitted with a plurality of teeth. Additionally, an enlarged view 116 accompanying the enlarged view 112 shows a new part 118, which is a tooth, and a worn part 120, which corresponds to the new part 118 after some amount of work performed by the machine 104 (and the new part 118). Stated differently, the worn part 120 may depict an in-use part to be imaged using the sensor 110, whereas the new part 118 may depict an "as manufactured" or nominal part.

Additionally in this example, FIG. 1 shows the mill 114 fitted with a plurality of teeth around the exterior surface of the mill 114 and operable on the bottom side or ground engaging side of the machine 104. Consequently, not every tooth may be readily accessible for replacement in all orientations of the mill 114. Illustrative examples include causing movement of the mill 114, for example, causing the mill 114 to rotate to an orientation that presents or moves the worn part 120 to a position for an operator to replace the worn part 120 with the new part 118. In the example of the cold planer, there may be an access hatch or guard (not pictured) that allows an operator to access a portion of the mill 114 without removing the mill 114 from the machine 104. Rotating the mill 114 to a replacement orientation may cause one or more teeth including, for example, the worn part 120, to be accessible for replacement. Another tooth at another circumferential location on the mill 114 may have a different replacement orientation with respect to the worn part 120 and may require the mill 114 to rotate to another location.

Although FIG. 1 uses a cold planer as the machine 104 and a ground-engaging tooth as the illustrated new part 118, other examples are contemplated. For example, and without limitation, the machine 104 may represent a work machine, such as a track-type tractor, a wheel loader, a generator set, an oil drill, or any other type of machine that performs an intensive work task. In addition to or instead of the illustrated teeth, work machines may include other high-stress parts including tracks made of individual track links, blades having edges for moving materials, and/or other parts that wear over time as the machine is used to perform various tasks. Other examples of the machine 104 can include an industrial transport machine, such as a locomotive, a haul truck, a bus, an aircraft, or other such machine that moves people or payloads. By way of nonlimiting example, an aircraft may have turbine fan blades, bleed ports, or other parts subject to high stresses that cause such parts to wear over time and need periodic replacement. The machine 104 may also embody a vehicle, such as a passenger truck, car, or other over the road vehicle. Such machines also have high-stress parts, such as axles or tires, that wear with use and eventually need replacing. In still further implementations, the machine 104 may be a work tool, such as a saw or drill having one or more parts, such as teeth or bits, that wear over time with use. In this disclosure, parts of the machine 104 that are subject to stresses that cause such parts to wear over time and with use, may referred to as "wear parts." Techniques described herein can determine wear and replacement needs of such wear parts regardless of the type of machine with which they are associated.

The user 106 may be any person or entity associated with the machine 104. By way of nonlimiting example, the user 106 may be an owner, an operator, a technician, a repair person, a customer service representative, dealer personnel, or any other person concerned with the machine 104. As noted above, and explained in more detail herein, the user 106 may operate the sensor 110 to capture sensor data of wear parts, such as the worn part 120. Additionally or alternatively, the sensor may be mounted to the machine 104 with a view of the mill 114 and one or more of wear parts, such as the worn part 120. In examples, the sensor 110 may be an, optical sensor, a three-dimensional camera or a range finding sensor, including but not limited to a radar sensor, a light detection and ranging (LIDAR) sensor, or the like. By way of non-limiting example, the sensor 110 can be a time-of-flight sensor configured to generate depths associated with each captured pixel. In examples, the sensor 110 can be mounted on the machine and/or in in association with an image capture station, and the worn part 120 may be placed relative to the sensor 110 for sensing and/or image capture. In other implementations, the sensor 110 can be operable by the user 106 to capture sensor and/or image data about the worn part 120. For example, the worn part may be mounted on the machine 104 and the user 106 may capture an image of the worn part 120 with sensor 110. By way of non-limiting example, the sensor 110 may be a hand-held or otherwise moveable imager or sensor and the user 106 may situate the sensor 110, e.g., at the worksite 102, to capture images of the worn part 120.

The user device 108 may be a mobile device carried by or otherwise accessible to the user 106 at the worksite 102. In implementations, the user device 108 may be embodied as a smartphone, a mobile phone, a tablet computer, a personal digital assistant, a network-enabled camera or sensor, or other computing device. Moreover, and as described herein, the user device 108 may include functionality to determine a degree of wear of the worn part 120, e.g., relative to the new part 118. By way of nonlimiting example, the user device 108 can receive sensor data (e.g., point cloud data, an image, a set of images, or combinations thereof) generated by the sensor 110. In some examples, functionality of the sensor 110 and the user device 108 may be integrated into a single device. For example, the user device 108 may have an integrated sensor 110. In other examples, the user device 108 may receive sensor data from the sensor 110 (e.g., via a physical connection, a wireless connection, and/or a network 122). Additionally or alternatively, examples also include the user device 108 being incorporated into and physically connected to the machine 104.

As also illustrated in FIG. 1, the environment 100 may include one or more data processing systems 124. As illustrated, the data processing system(s) 124 may be configured to communicate with one or more of the machine 104, the user device 108, and/or the sensor 110 via the network(s) 122. Although the data processing system(s) 124 is shown as separate from the machine 104, the user device 108, and the sensor 110, in some examples, functionality of one or more of these components may be carried out over fewer devices. By way of non-limiting example, the user device 108 may include some or all functionality of the data processing system(s) 124. Moreover, functionality described herein and ascribe to one or more of the illustrated components may further be performed by a different one or more of the components and/or by entirely different components.

The data processing system(s) 124, may also be the same as one or more wear processing systems, and are generally configured to receive sensor data generated by the sensor 110 of the worn part 120 and determine whether a wear part, for example, worn part 120 needs replacing. Examples contemplate evaluating data from the sensor 110, for example, point cloud data, an image, or a plurality of images of the wear part, for example worn part 120, against a wear model 126. Examples contemplate that the wear model 126 may be based at least in part on a tailored mathematical model of the wear, predicted wear, acceptable wear, wear patterns, or combinations thereof among others. Examples contemplate the wear model 126 may be based at least in part on one or more machine learning algorithms and/or model. For example, the wear model 126 may provide an indication that, based at least in part on the data from the sensor 110 that the worn part 120 needs to be replaced. Examples contemplate that wear model 126 may provide an estimated time until the worn part 120 will need to be replaced, e.g., wear duration.

As an example, wear model 126 may use the following pseudo code to determine whether the part should be replaced:

Receive image data representing tool;
Process image data to return state model representing tool status;
Evaluate state model with trained wear model;
    Compare state model to determined wear thresholds of trained wear model
        When beyond wear threshold, Return replace indication;
        When below wear threshold, determine remaining wear duration;

-continued

Compare to inspection cycle;
        When remaining wear is below time to next inspection,
            Return replace indication
Return.

Various examples contemplate that wear model 126 may based on training data. For example, the training data may include information on wear parts including, but not limited to, one or more images of each part, a designation as to whether the respective part should be replaced, a time in service of the respective part, among others, or combinations thereof. Based at least in part on this training data, wear model 126 may be generated, refined, or tailored to suit a machine, a model of machine, a type of machine, an operating environment of a machine, a configuration of a machine, among others, or combinations thereof.

The data processing system(s) 124 may also include batch aggregator 128. Examples include where data is collected from the sensor 110 at regular, predicted, or predetermined intervals, for example, an expected inspection period. In these examples, batch aggregator 128 may combine this information to further evaluate output from wear model 126. For example, when wear model 126 provides an estimated time until the worn part 120 will need to be replaced (e.g., wear duration of the worn part 120), batch aggregator 128 may group wear parts with other wear parts having similar estimated times until needed replacement or may group wear parts having a wear duration ending before the next inspection, predicted inspection, or estimated inspection. For example, based on collected data, wear model 126 may determine that a first worn part may have a first wear duration, a second worn part may have a second wear duration, and a third worn part may have a third wear duration. In this example, the first and second wear durations may be less than the expected inspection period or may end before the next inspection, while the third wear duration may be greater than the expected inspection period or end after the next inspection period. In this case, the batch aggregator 128 may aggregate the first and second worn parts together in a first batch and the third worn part in a second batch. In this example, the data processing system(s) 124 may return an indication that the first and second worn parts need to be replaced. The system may retain the second batch for further processing or may flag the associated parts for future monitoring.

Additionally or alternatively, examples include that based at least in part on batch aggregator 128 aggregating more than one part needing replacing prior to the next expected inspection, the data processing system(s) 124 may return an indication that a plurality of parts to be replaced at one time. Examples contemplate that the system may reduce the amount of time a machine, for example, machine 104, is down for maintenance to replace a worn part by identifying and replacing other worn parts that would likely be worn before the next anticipated part inspection. This system may also reduce the number of unnecessary early replacement of worn parts preventing a fuller consumption of the wear part, and reduce the number of late replacement of worn parts that may cause damage to the underlying support or other parts of the machine 104, for example the mill 114. Said another way, these techniques may be used to avoid an inaccurate calculation of wear, which may result in overuse of parts e.g., causing disruptive failures, and/or underuse of parts, thereby increasing cost.

Additionally or alternatively, depending on the configuration of the environment 100, different machines may be configured with different tools. For example, in a first environment, a road milling machine may be configured with a first mill (e.g., (competition rotor, spade rotor, varied bit density) fitted with a first type of tool holder holding a first type of tool. In a second environment, the road milling machine may be configured with a second mill fitted with a second type of tool holder holding a second type of tool. In a third environment, the road milling machine may be configured with either the first or second mill and may be fitted with the first and/or second type of tool holder holding the first and/or second type of tool. In these examples, a wear model 126 may be tailored to each configuration of the machine or a representative configuration of the machine. Additionally or alternatively, the wear model 126 may be tailored to individual tool and tool holder configurations. For example, a first location on a mill fitted with the first type tool holder holding the first type of tool may be monitored and/or evaluated with a first wear model, while a second location on the mill fitted with the second type of tool holder holding the second type of tool may be monitored and/or evaluated with a second wear model.

Additionally or alternatively, the data processing system(s) 124, may also be configured to receive sensor data generated by the sensor 110 of the configuration of machine 104 and determine which wear model 126 is applicable. Examples contemplate evaluating data from the sensor 110, for example, point cloud data, an image, or a plurality of images of the machine 104, a configuration of the mill 114, a wear part, for example worn part 120, tool holder, among others, to determine a wear model 126. In this example, the determined wear model 126 may be applied to the configuration of the machine 104 to determine wear. Examples include the wear model 126 being a first wear model applied to a first location of a first type of tool according to the configuration of the machine 104 and a second wear model applied to a second location of a second type of tool according to the configuration. Examples contemplate that this baseline may be used to determine which wear model to use to evaluate a tool in a given environment.

Depending upon the configuration of the environment 100, the data processing system(s) 124 may have different roles or different degrees of involvement in carrying out the disclosed techniques. For instance, aspects of the environment 100 may be configured as a server-based environment or a cloud-based environment that perform the disclosed wear determination techniques as part of the service over the network(s) 122. In such a server- or cloud-based environment, the data processing system(s) 124 (e.g., the server or cloud), may receive sensor data from the sensor 110 and/or from the user device 108 (which may receive the sensor data from the sensor 110). In this example, the data processing system(s) 124 may then process the sensor data to determine whether the part should be replaced, and return results of the processing to the user device 108 over the network(s) 122. Thus, in a server- or cloud-based environment, the data processing system(s) 124 may perform the bulk of the computing operations, while the user device 108 may function as a portal (e.g., via an application or browser) that allows the user 106 to access the services of the data processing system(s) 124 over the network(s) 122. In some examples, the user device 108 may access (e.g., download) a software application that allows the user 106 to access the data processing system(s) 124 and/or two interact with data received from the data processing system(s) 124, as detailed further herein.

The environment 100 also includes the maintenance support system(s) 130, which may represent one or more computing systems associated with specific machines, machine models, machine databases, fleets of machines, among others, or combinations thereof. In some implementations, the worn part 120 is associated with a specific machine, e.g., machine 104, and a specific location on the machine. This information may be determined and/or maintained in part location 132, for example a database. For example, the worn part 120 may have a location 134 on the mill 114. This location information may be kept in part location 132 associated with the machine 104 and may be aggregated across multiple databases, platforms, fleets, among others, or combinations thereof.

Additionally or alternatively, in various examples, data contained in part location 132 may be supplied to the user 106 through the user device 108 via network(s) 122. Examples contemplate that this information may be combined with current information of the machine 104. For example, the user 106 may stop the machine 104 and receive a current state of the machine 104 through the user device 108. Additionally, examples contemplate that the user device 108 may cause the machine 104 to move or expose a portion of the machine. For example, the user device 108 may cause the machine 104 to rotate the mill 114 to cause the worn part 120 at location 134 to be accessible for replacement, for example, by the user 106.

Additionally or alternatively, various examples contemplate that an indication may be provided to the user 106 as to the location of the worn part 120. For example, the user device 108 may display a location address for location 134, which the user 106 may view to aid the user 106 in locating and replacing the worn part 120. Additionally or alternatively, the user device 108 may provide a diagram representation of the mill 114 with location 134 highlighted. Additionally or alternatively, the user device 108 may provide a view of the mill 114 and when location 134 is in view, the user device 108 may provide an overlay of the image of the mill 114 indicating location 134. This view may be updated regularly, for example, as a live-view of the mill 114. Additionally or alternatively, the user device 108 may include a display where portions of the display are transparent. For example, the display may include a lens of glasses or a heads-up-display type device. In this example, the display may display an overlay of location 134 over the user's view of the mill 114. Additionally or alternatively, examples include additional information being displayed on the display. For example, the display may include instructions for replacing the part, a check list of items to watch or evaluate, warnings, recommended techniques, alternative techniques, a list of replaced parts, a list of parts to be replaced, another location of another worn part, a location of a removed part that has yet to be replaced, among others, or combinations thereof.

Additionally or alternatively, examples contemplate one or more indicating devices. For instance, an enlarged view 136 accompanying the enlarged view 112 shows a side cutaway view of the mill 114 with a plurality of teeth distributed around the mill's outer surface. Enlarged view 136 show a sensor, for example, an optical indicating device 138. The optical indicating device 138 may direct an optical indicator 140 to the worn part 120 at location 134. For example, the optical indicating device 138 may include a light source, a laser diode, a laser pointing device, where the light outputted by the device may be directed to worn part 120 at location 134 to provide a visual indication to an operator, for example, user 106 of the location of the part to be replaced.

Additionally or alternatively, enlarged view 136 also shows worn part 120 having been moved to replacement orientation 142. In this instance, the mill 114 assembly containing the worn part 120 to a position 144 to allow the worn part 120 to be replaced by an operator, for example, user 106. In this example, position 144 orients the worn part 120 at location 134 on the mill 114. This illustrative example provides for the user 106 to have access to the worn part 120 to replace it. However, other examples contemplate that position 144 may be located elsewhere with respect to the mill 114 and/or machine 104 depending on the configurations thereof. As with other elements of the environment 100, the maintenance support system(s) 130 may include any number or combination of computing elements enabling communication, storage, and processing to carry out the disclosed techniques.

In FIG. 1, the network(s) 122 may represent any type combination of electronic communication networks configured to communicate data between nodes connected to the network(s) 122. For example, and without limitation, the network(s) 122 may represent the Internet, an ethernet, a local-area network, a wide-area network, a personal area network, a cellular network, a telephone network, or any combination thereof. In at least some embodiments, the network(s) 122 may include a mobile network and related infrastructure operable to provide Internet connectivity to the user device 108 such as according to a 2G, 3G, 4G, 5G, and/or LTE communication network.

Techniques described herein may include providing information about the wear determined and replacement procedures according to implementations described in connection with FIG. 1 to a user, such as the user 106. By way of non-limiting example, the data processing system(s) 124 may send signals (e.g., including information about the worn part(s)) to the user device 108 to provide information about wear parts on the machine 104 to the user 106.

Figure 2:
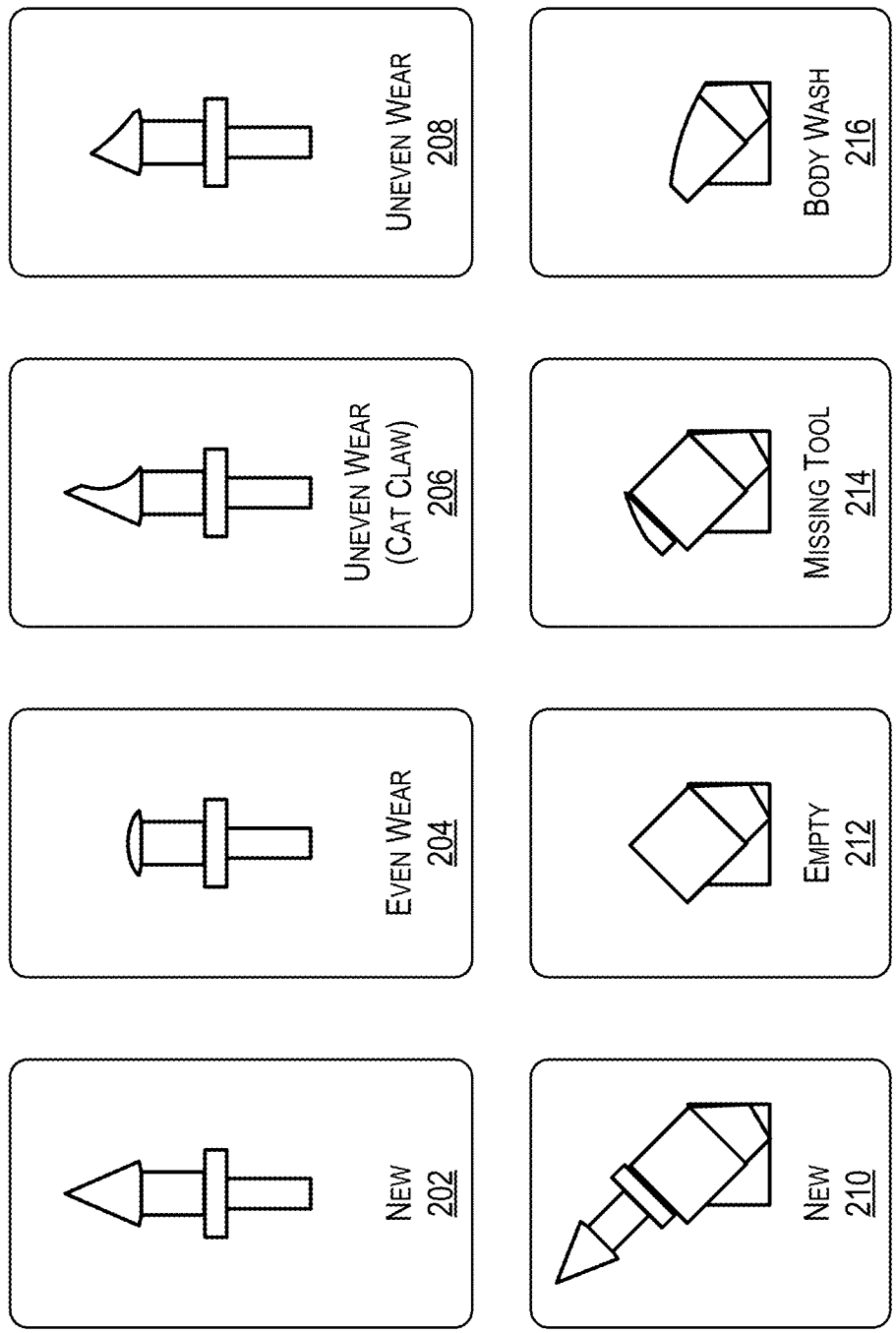
FIG. 2 is a representation of exemplary part wear modes and configurations according to aspects of this disclosure.

FIG. 2 shows representations of exemplary part wear modes and configurations. For example, FIG. 2 shows a portion of an illustrative part wear model 200 which include illustrative wear modes for parts, for example worn part 120 and/or new part 118. FIG. 2 shows a new part 202 representative of a part that has not yet been used or has minor use or wear. Even wear part 204 shows a part that has reached a point where it should be replaced. Some characteristics of even wear part 204 that may determine that it should be replaced may include the overall length, length of the bit, width, and/or shape. Uneven wear part 206 shows a part that may need to be replaced. Some characteristics of uneven wear part 206 that may determine that it should be replaced may include the overall length, length of the bit, width, and/or shape. For example, the uneven wear part 206 shows a configuration commonly referred to as "cat claw" where the overall length of the part may be well within the operational limits, however, a portion of the tip has worn away, in this case unevenly, and may resemble a claw of a cat. In examples, this part may be replaced as the cat claw wear pattern may cause the tip to break off and may cause additional damage to other parts and/or the machine. Uneven wear part 208 shows a part that may or may not need to be replaced. However, the uneven wear part 208 may indicate an underlying problem with the machine and/or part. For example, the uneven wear part 208 may be relatively close to an expected wear pattern, however, since it is uneven, it could still break sooner than expected. Additionally or alternatively, the uneven wear part 208 may be indicative of the part not rotating within its tool holder. Since the part is not rotating, a warning and/or notice may be generated and provided to a user to investigate or inspect.

FIG. 2 also shows illustrative tool holders. For example, machines using replaceable parts, for example, new part 202, may mount the replaceable parts in tool holders. These tool holders may facilitate the replacement of the worn parts. In this example, the new tool holder 210 may be representative of a new tool holder or a tool holder that is in good condition. The new tool holder 210 also shows a new part, such as new part 202, mounted therein. FIG. 2 also shows the empty tool holder 212. The empty tool holder 212 may indicate that a tool has fallen out or needs to be replaced. In this example, a warning and/or notice may be generated and provided to a user to investigate or inspect, for example, to determine whether a new part should be installed or whether the empty tool holder 212 is damaged or otherwise needs replacing itself. The missing-tool tool holder 214 shows an example, where the part has worn away or has broken off. In this example, a warning and/or notice may be generated and provided to a user to investigate or inspect, for example, to determine whether a new part should be installed or whether the missing-tool tool holder 214 is damaged or otherwise needs replacing itself. FIG. 2 also shows body tool holder 216 showing a wear pattern that has consumed the part (or the part fell or broke off) and part of the tool holder itself. In this example, a warning and/or notice may be generated and provided to a user to investigate or inspect and replace the body wash tool holder 216.

Figure 3:
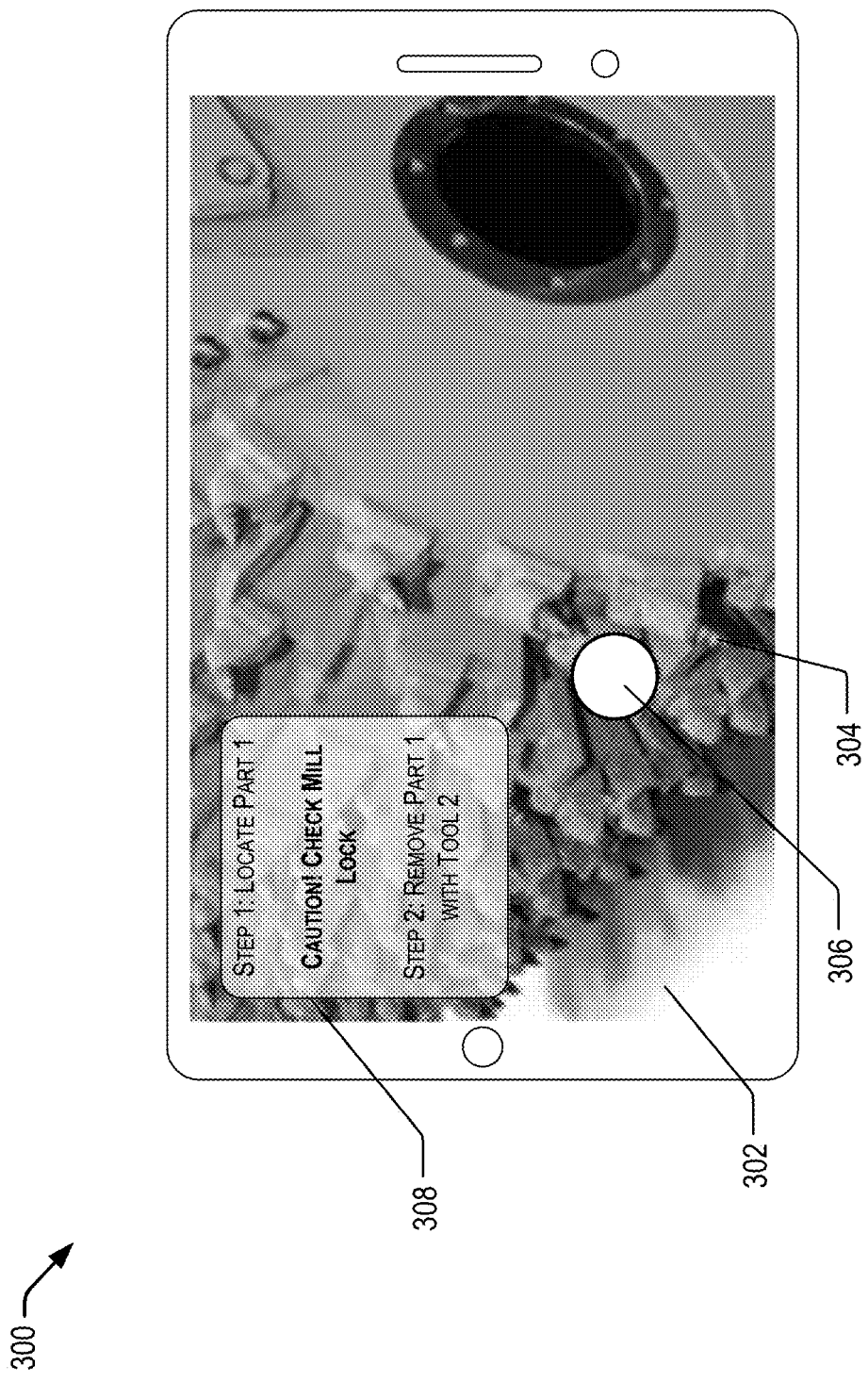
FIG. 3 is a schematic illustration of an example user interface depicting wear information and replacement information for a wear part, such as the part illustrated in FIG. 1, according to additional aspects of this disclosure.

FIG. 3 illustrates a wear part status interface 300. The wear part status interface 300 is illustrated as being displayed on the user device 108, e.g., for viewing by the user 106. The wear part status interface 300 may have one or more user interface elements allowing the user 106 to provide or control information about the status of wear parts, such the worn part 120, e.g., a ground-engaging tooth. The wear part status interface 300 may include a view 302 of the part and the surrounding equipment 304, for example, the worn part 120 on the mill 114. In the example, the wear part status interface 300 may display an overlay indicator 306 indicating the location of the worn part 120 on the mill 114 at location 134. Additionally or alternatively, view 302 may also include overlay information 308 displaying information that may be useful to a user, for example, user 106.

Figure 4:
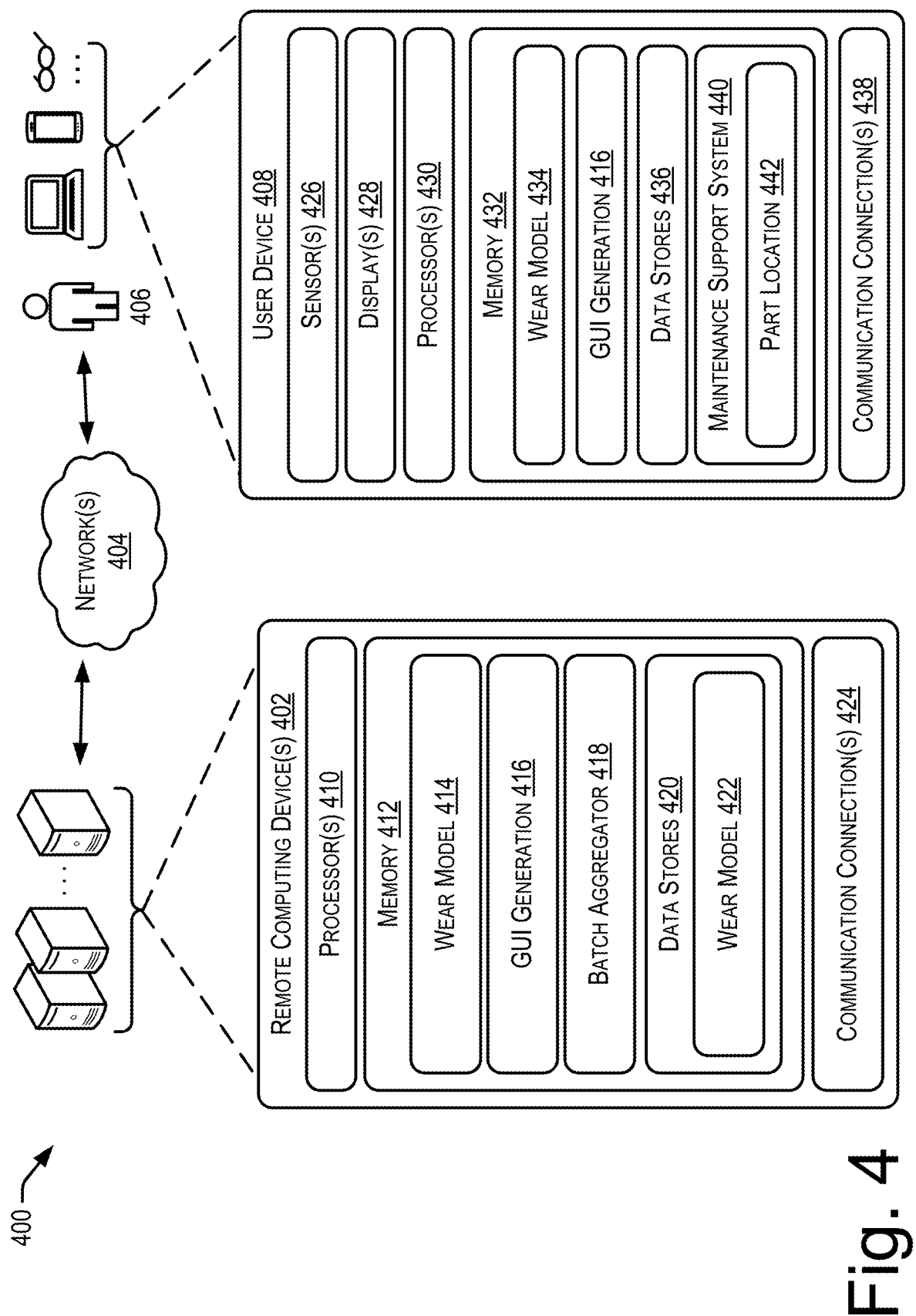
FIG. 4 is an example computing environment for determining a wear status for a wear part, according to aspects of this disclosure.

FIG. 4 is a diagram illustrating an example system 400 for quantifying part wear and replacement instructions in accordance with implementations described herein. In at least one example, the system 400 can include one or more remote computing device(s) 402 communicating over one or more networks 404 with a user device 408 which may be associated with a user 406. The remote computing device(s) 402 may be the data processing system(s) 124, in some examples. The user device 408 may be the user device 108, and the user 406 may be the user 106, for example. Some non-limiting examples of the user device 408 may include tablet computing devices, desktop computing devices, laptop computing devices, mobile computing devices, or any other device capable of accessing and rendering graphical user interfaces and communicating with the remote computing device(s) 402. The network(s) 404 may include a local area network (LAN), a wide area network (WAN), including but not limited to the Internet, or any combination thereof, and may include both wired and wireless communication technologies using any suitable protocols and communication techniques.

The remote computing device(s) 402 can include processor(s) 410 and memory 412 communicatively coupled with the processor(s) 410. In the illustrated example, the memory 412 of the remote computing device(s) 402 stores a wear model 414, a graphical user interface (GUI) generation system 416, and a batch aggregator 418. Although these systems are illustrated as, and will be described below as, separate components, functionality of the various systems may be attributed differently than discussed. Moreover, fewer or more systems and components may be utilized to perform the various functionalities described herein. The memory 412 may also include data stores 420, which may include models, for example wear model 422. Though depicted in FIG. 4 as residing in the memory 412 for illustrative purposes, it is contemplated that the wear model 414, the GUI generation system 416, the batch aggregator 418, and/or any or all of the data stores 420 may additionally, or alternatively, be accessible to the remote computing device(s) 402 (e.g., stored on, or otherwise accessible by, memory remote from the remote computing device(s) 402).

In at least one example, the wear model 414 can include functionality to determine a wear status associated with a wear part, such as the worn part 120. For example, the wear model 414 may be substantially the same as the wear model 126 discussed above. In examples, the wear model 414 can received sensor data of a measured part, align the sensor data with one or more wear models 422 stored in the data stores 420.

In some examples, the GUI generation system 416 can include functionality to generate one or more interactive interfaces, such as the GUI for interface 300 for presentation on the user device 408. In some examples, the GUI generation system 416 may receive information from the wear model 414 and/or the wear models 422 to generate the GUIs. By way of nonlimiting example, and with reference to FIG. 3, the GUI generation system 416 may receive information about the amount of wear from the wear model 414 and details about the machine 104 to generate the wear part status interface 300 and view 302 with overlay indicator 306, respectively.

The batch aggregator 418 may include functionality to determine a batch of wear parts that should be replaced at the next maintenance break, as described herein. In examples, the batch aggregator may be the same as the batch aggregator 128. For instance, the batch aggregator 418 may determine the grouping of worn parts based on the part under consideration and/or other factors.

The remote computing device(s) 402 may also include communication connection(s) 424 that enable communication between the remote computing device(s) 402 and other local or remote device(s), including but not limited to the maintenance support system(s) 130. For instance, the communication connection(s) 424 can facilitate communication with the user device 408, such as via the network(s) 404. The communication connection(s) 424 can enable Wi-Fi-based communication such as via frequencies defined by the IEEE 802.11 standards, short range wireless frequencies such as BLUETOOTH®, other radio transmission, or any suitable wired or wireless communications protocol that enables the respective computing device to interface with the other computing device(s).

In some implementations, the remote computing device(s) 402 can send information, such as instructions to generate GUIs, to the user device 408, via the network(s) 404. The user device(s) 408 can receive such information from the remote computing device(s) 402 and display the GUIs on a display 428 of the user device 408. In some implementations, the user device 408 can perform some of the functions attributed to the remote computing device(s) 402, including generating the GUIs, for example. To facilitate creation of the GUIs, the user device 408 may receive information from the remote computing device(s) 402. In at least one example, the user device 408 can include one or more processors 430 and memory 432 communicatively coupled with the processor(s) 430. In the illustrated example, the memory 432 of the user device 408 may store a wear model 434 and/or include data stores 436. In examples, the wear model 434 can be substantially the same as the wear model 414 and the data stores 436 can include some or all of the same information stored in the data stores 420.

The user device 408 may also include communication connection(s) 438 that enable communication between the user device 408 and other local or remote device(s). For instance, the communication connection(s) 438 can facilitate communication with the remote computing device(s) 402, such as via the network(s) 404. The communications connection(s) 438 can enable Wi-Fi-based communication such as via frequencies defined by the IEEE 802.11 standards, short range wireless frequencies such as BLUETOOTH®, other radio transmission, or any suitable wired or wireless communications protocol that enables the respective computing device to interface with the other computing device(s).

As also illustrated in FIG. 4, the user device 408 may also include a sensor 426. For instance, the sensor 426 may be the same as the sensor 110, and may be integrated into the user device 408 or otherwise in communication with the user device 408. In examples, the sensor 426 may be an imaging device configured to capture three-dimensional sensor data associated with a worn part, as described herein. The sensor 426 may be a ranging sensor, such as a radar sensor, a LIDAR sensor, a time-of-flight sensor, or the like. In other examples, the sensor 426 can be a three-dimensional camera.

As also illustrated in FIG. 4, the user device 408 may also include maintenance support system(s) 440 in memory 432. For instance, maintenance support system(s) 440 may be the same as maintenance support system(s) 130, and may include part location 442. The information provided from maintenance support system(s) 440 may be used to enable the wear part status interface 300.

The processor(s) 410 of the remote computing device(s) 402 and the processor(s) 430 of the user device 408 can be any suitable processor capable of executing instructions to process data and perform operations as described herein. By way of example and not limitation, the processor(s) 410, 430 can comprise one or more Central Processing Units (CPUs), Graphics Processing Units (GPUs), or any other device or portion of a device that processes electronic data to transform that electronic data into other electronic data that can be stored in registers and/or memory. In some examples, integrated circuits (e.g., ASICs, etc.), gate arrays (e.g., FPGAs, etc.), and other hardware devices can also be considered processors in so far as they are configured to implement encoded instructions.

The memory 412 and the memory 432 are examples of non-transitory computer-readable media. The memory 412, 432 can store an operating system and one or more software applications, instructions, programs, and/or data to implement the methods described herein and the functions attributed to the various systems. In various implementations, the memory can be implemented using any suitable memory technology, such as static random-access memory (SRAM), synchronous dynamic RAM (SDRAM), nonvolatile/Flash-type memory, or any other type of memory capable of storing information. The architectures, systems, and individual elements described herein can include many other logical, programmatic, and physical components, of which those shown in the accompanying figures are merely examples that are related to the discussion herein.

Although various systems and components are illustrated as being discrete systems, the illustrations are examples only, and more or fewer discrete systems may perform the various functions described herein. Moreover, functionality ascribed to the remote computing device(s) 402 may be performed at the user device 408 and/or functionality ascribed to the user device 408 may be performed by the remote computing device(s) 402.

Figure 5:
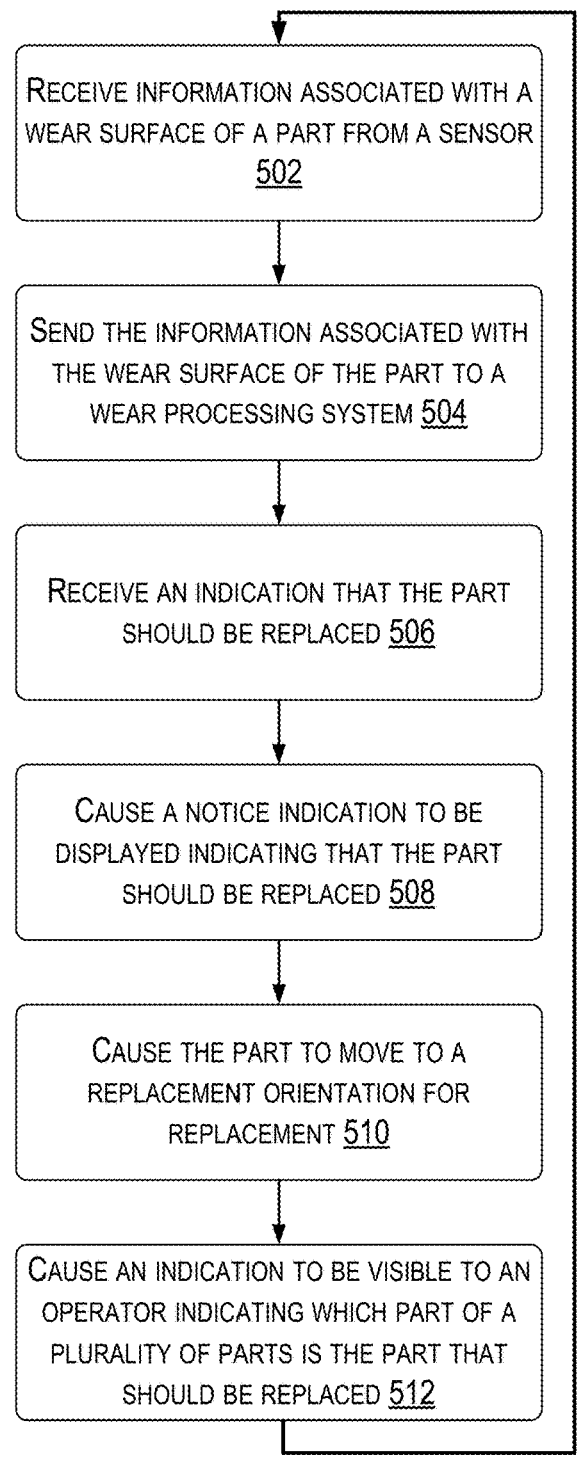
FIG. 5 is a flowchart of an exemplary method for determining a wear status of a wear part according to aspects of this disclosure.
Figure 6:
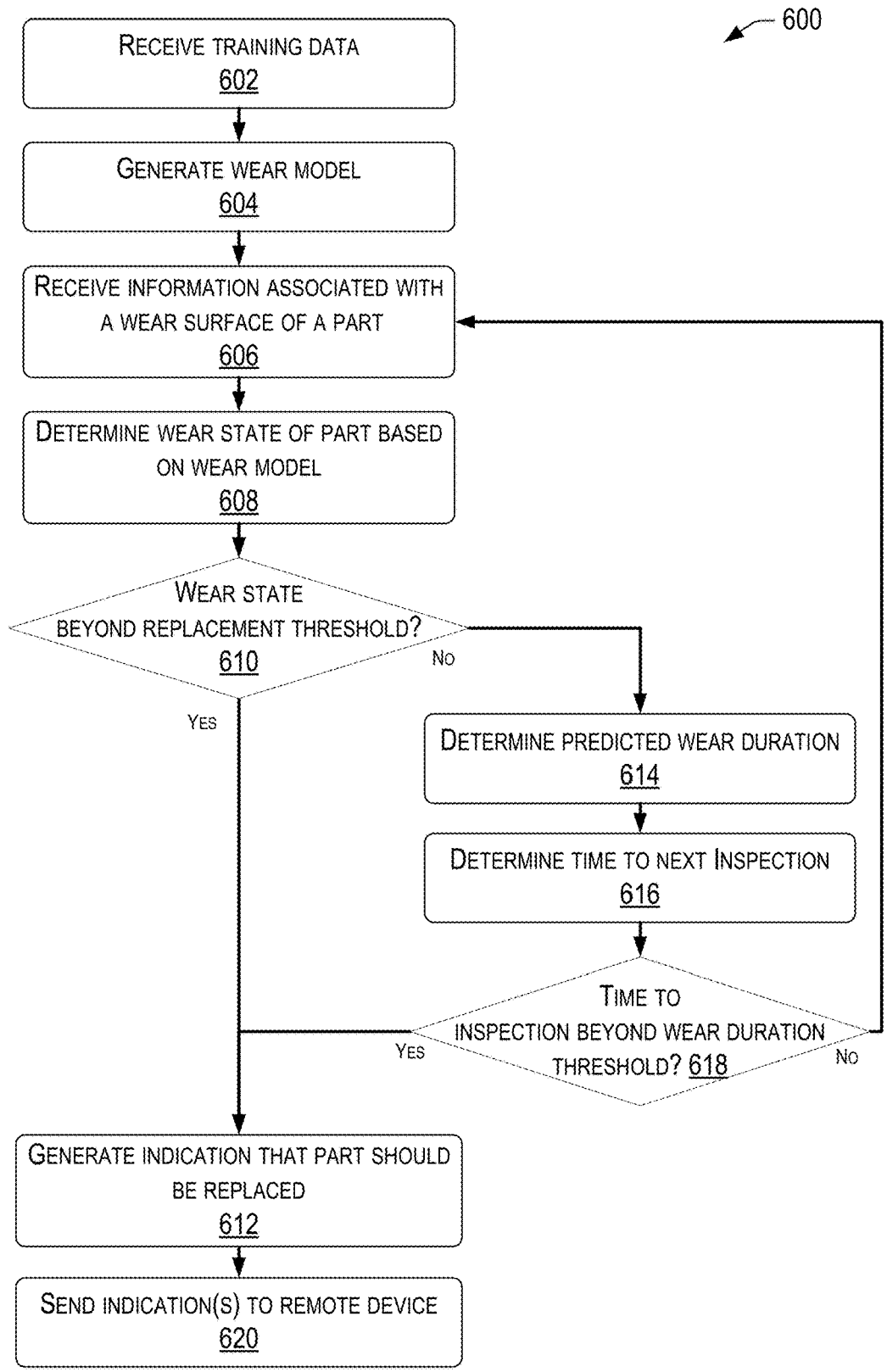
FIG. 6 is a flowchart of an example method for taking action in response to determining a wear status for a wear part according to aspects of this disclosure.

FIGS. 5 and 6 illustrate flow charts depicting example processes 500 and 600 of the present disclosure, which may be related to determining part wear, as descried herein. The example processes 500 and 600 are illustrated as a collection of steps in a logical flow diagram, which steps represent acts or operations that can be implemented in hardware, software, or a combination thereof. In the context of software, the steps represent computer-executable instructions stored in memory. When such instructions are executed by, for example, the processor(s) 410, 430, such instructions may cause the processor(s) 410, 430 and/or various components of the computing device(s) 402 and/or the user device 408 to perform the recited acts or operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes. In some embodiments, one or more blocks of the process can be omitted entirely. Moreover, the processes 500 and 600 can be combined in whole or in part with other methods.

In more detail, FIG. 5 shows an exemplary process 500 for determining wear of a wear part, such as the worn part 120, which may be associated with a machine, such as the machine 104. The process 500 may be performed by the data processing system(s) 124, the remote computing device(s) 402, and/or the user devices 108, 408, although other components may perform some or all of the operations of the process 500. In addition, the operations of the process 500 need not necessarily be performed in the order shown in FIG. 5, and may be performed in different orders consistent with the disclosed embodiments.

At operation 502, the process 500 can include receiving sensor data of a wear part. For example, the data processing system(s) 124 or user device 108 may receive information associated with a wear surface of a part, for example, worn part 120. The wear surface may include surfaces of the part that are expected or are designed to wear, as well as surfaces or structures that are in proximity to or support the surface that is expected to wear. For example, the wear surface may include surfaces, parts, structures, and/or bodies of the new part 118, worn part 120, new part 202, worn part 204, uneven wear part 206, uneven wear part 208, new tool holder 210, empty tool holder 212, missing-tool tool holder 214, body wash tool holder 216, among others, or combinations thereof.

The information may be generated and/or transmitted to the data processing system(s) and/or the user device 108 by a sensor, for example sensor 110. In examples, the user 106 may be prompted to capture certain images of the worn part 120 or other parts on the mill 114 or all parts on the mill 114.

In examples, the sensor 110 may be mounted on a stanchion or other frame that is configured to arrange the sensor 110 relative to the worn part 120. In at least some examples, the sensor data may be point cloud data comprising a plurality of points and depths associated with the points (e.g., depths relative to sensor 110). In examples, the sensor 110 may be a range-finding sensor, such as a time-of-flight sensor, a LIDAR sensor, a radar sensor, 3D scanner, or the like. Additionally or alternatively, the sensor 110 may be configured to collect sensor data on other parts on the mill 114, for example other mill teeth. In examples, the sensor 110 may be configured to collect data while the mill 114 is at rest, in motion, or in motion below a threshold hold rotational speed. For example, the sensor 110 may capture information of multiple worn parts while the mill is turning at a speed below an operational speed, where the operational speed is the speed at which the mill 114 turns while the machine 104 is operating. Additionally or alternatively, in some examples, some protective equipment need not be removed for the sensor 110 to collect data. For example, protective equipment may include shields, shrouds, guards, bars, windows, barriers, or combinations, among others. The protective equipment may be designed and installed to protect people, operators, other equipment, other parts of the machine, the operating environment, among others, or combinations thereof. In examples where the sensor 110 may operate where some or all protective equipment need not be removed, moved, or adjusted, then the sensor 110 may collect data without the user 106 needing to spend additional time or efforts making such removals, movements, or adjustments.

At operation 504, the process may include sending, for example, by a processer or controller, the information associated with the wear surface of the part to a wear processing system. In examples, the wear processing system may be the same as data processing system 124 where the process may cause information about wear part 120 to be sent from the machine 104, the user device 108, a combination thereof among others, to data processing system 124. In examples, including process 600 as discussed elsewhere, data processing systems may use the information sent at operation 504 to evaluate the wear on the wear part 120.

At operation 506, the process may include receiving an indication that the part should be replaced. For example, the wear processing system (e.g., data processing system 124) may use the information sent at operation 504 to determine whether the worn part 120 should be replaced. The wear processing system may send or provide an indication that the part or certain parts should be replaced. This indication may be presented to the user 106 through the machine 104 or the user device 108. The indication may include a location on the mill 114, for example location 134, of the worn part 120, a replacement orientation 142, for example position 144, of the mill 114, a time to replace the parts by, a recommended inspection or maintenance period, among others or combinations thereof.

At operation 508, the process may include the processor (e.g., of the user device 108 or the machine 104) causing a notice indication to be displayed indicating that the part should be replaced. This notice indication may indicate that one or more parts should be replaced immediately, at the next scheduled maintenance, at the next scheduled inspection, at the next convenient time within a limit, within a set period of time, among others, or combinations thereof.

At operation 510, the process may include the processor (e.g., of the user device 108 or the machine 104) causing the part to move to a replacement orientation for replacement.

For example, the indication may include a location on the mill of the worn part to be replaced. The user 106 may provide an indication, an input, and/or a request to cause the machine 104 to move the mill 114 to replacement orientation 142. This indication may be provided, for example, through the user device 108 or the machine 104 directly.

At operation 512, the process may include the processor (e.g., of the user device 108 or the machine 104) causing an indication to be visible to an operator indicating which part of a plurality of parts is the part that should be replaced. For example, operation 512 can include causing display of a graphical user interface including the indication. For example, the data processing system(s) 124 or the user device 108 can generate a graphical user interface, e.g., the interface 300, and send information that causes the user device 108 to render the interface 300 on its display. In examples, the interface 300 can display additional information about the wear part, replacement instructions, warnings, or other information. In examples, the user device 108 display an indicator in an overlay on an optical element in a field of view of the operator or user augmenting the operator's real world view of the of the real world. In examples, the user device 108 or the machine 104 may display an image illustrating the part installed and an indicator referencing the part.

In other examples, the data processing system(s) 124 or the user device 108 can generate or provide coordinate information or orientation information to cause the optical indicating device 138 to project the optical indicator 140 onto the worn part 120 on the mill 114 such that the user 106 may identify the worn part 120 on the mill 114. In examples, the optical indicating device 138 may be a laser diode and may project a beam of visible light onto a portion of the worn part to create the optical indicator 140.

FIG. 6 shows an exemplary process 600 for determining wear of a wear part, such as the worn part 120, which may be associated with a machine, such as the machine 104. The process 600 may be performed by the data processing system(s) 124, the remote computing device(s) 402, and/or the user devices 108, 408, although other components may perform some or all of the operations of the process 600. In addition, the operations of the process 600 need not necessarily be performed in the order shown in FIG. 6, and may be performed in different orders consistent with the disclosed embodiments.

At operation 602, the process may include the data processing system(s) 124 receiving training data. In examples, the training data may include information on wear parts including, but not limited to, one or more images of each part, a designation as to whether the respective part should be replaced, a time in service of the respective part, among others, or combinations thereof. Based at least in part on this training data, the data processing system(s) 124 may generate, refine, or tailor wear model 126 to suit a machine, a model of machine, a type of machine, an operating environment of a machine, a configuration of a machine, among others, or combinations thereof.

At operation 604, the process may include the data processing system(s) 124 generating a wear model, for example wear model 126. Examples contemplate that wear model 126 may be based at least in part on a tailored mathematical model of the wear, predicted wear, acceptable wear, wear patterns, or combinations thereof among others. Examples include that the wear model 126 may be based at least in part on one or more machine learning algorithms and/or model. For example, the wear model 126 may provide an indication that, based at least in part on the data from the sensor 110 that the worn part 120 needs to be replaced. Examples contemplate that wear model 126 may provide an estimated time until the worn part 120 will need to be replaced, e.g., wear duration.

At operation 606, the process may include the data processing system(s) 124 receiving information associated with a wear surface of a part. Examples include that the received information is similar to or the same as the information sent at operation 504 of process 500.

At operation 608, the process may include the data processing system(s) 124 determining wear state of part based on the wear model 126. Examples include evaluating data from the sensor 110, for example, point cloud data or an image or a plurality of images of the wear part, for example the worn part 120 against a wear model 126. Examples contemplate that wear model 126 may be based at least in part on a tailored mathematical model of the wear, predicted wear, acceptable wear, wear patterns, or combinations thereof among others. Examples contemplate the wear model 126 may be based at least in part on one or more machine learning algorithms and/or model. For example, the wear model 126 may provide an indication that, based at least in part on the data from the sensor 110 that the worn part 120 needs to be replaced. Examples contemplate that wear model 126 may provide an estimated time until the worn part 120 will need to be replaced, e.g., wear duration.

At operation 610, the process may include the data processing system(s) 124 determining whether the wear state beyond replacement threshold. In examples, the wear model 126 may provide a level of wear, such that, if the part is determined to be beyond that level of wear it should be replaced as wearing beyond the replacement threshold.

If yes, at operation 612, the process may include the data processing system(s) 124 generating an indication that part should be replaced. In examples, this indication is similar to or the same as the indication received at operation 506 of process 500.

If no, at operation 614, the process may include the data processing system(s) 124 determining a predicted wear duration. In examples, the wear model 126 may provide an estimate of wear, such that, if the part continues to be used at the current rate, the part will pass the replacement threshold at an estimated time defining the predicted wear duration.

At operation 616, the process may include the data processing system(s) 124 determining a time to a next inspection. Based on the information received including the type of part, machine, environment, among others, examples include wear model 126 or a data base accessible to data processing system 124, determining when the next inspection or maintenance is expected.

At operation 618, the process may include the data processing system(s) 124 determining whether the time to inspection is beyond a wear duration threshold. In examples, the data processing system 124 may compare the predicted wear duration with the time until the next inspection or maintenance.

If no, the process may return to operation 606. However, if yes, the process may proceed to operation 612. For example, if the part is expected to wear past the replacement threshold before the next expected maintenance, then the data processing system(s) 124 may generate a notification at operation 612.

At operation 620, the process may include the data processing system(s) 124 sending the indication(s) to a remote device, for example, machine 104, user device 108, among others or combinations thereof. In examples, the notifications generated at operation 612 may be aggregated or batched together for a given machine.

INDUSTRIAL APPLICABILITY

The disclosed systems and methods find application in any environment in which a user wishes to determine the wear of a wear part and/or an optimal time to replace a worn part. By using a sensor to capture sensor data of the wear part, e.g., an image or images of a surface of the wear part, and determine the degree of wear from the sensor data, the disclosed systems and methods allow the user to easily assess the part, even in the absence of detailed knowledge about the part, the part's wear characteristics, or the machine.

For example, and with reference to FIG. 1, the user 106 may operate the machine 104 at the worksite 102. After finishing a shift, or at some other interval, the user 106 may dismount the machine 104 and use the sensor 110 to capture sensor data about the worn part 120, e.g., a tooth on the mill 114 of the machine 104. The user 106 may then, using the user device 108 in communication with the sensor 110, transmit the sensor data to a remote computing system, such as the data processing system(s) 124. The data processing system(s) 124 may then determine an amount of wear of the worn part using a wear model 126. In more detail, the data processing system(s) 124 may use the wear model 126 to determine an estimated time left before the worn part needs to be replaced before causing damage to the machine 104. In examples, when it is determined that the worn part will wear out prior to the next expected maintenance, the system indicates that the part is in need of replacement, the data processing system(s) 124 may communicate such need to maintenance support system(s) 130, which may provide additional information, for example, location information of the worn part, to a user to enable an efficient replacement of the worn part.

Techniques described herein may improve efficiency at work sites, such as the worksite 102, and/or improve efficiency of machines, like the machine 104. By way of example and not limitation, techniques described herein can ensure that wear parts are properly maintained and/or replaced, which can lead to more efficient use of the machine 104, including but not limited to reduced fuel consumption and/or wear of other, ancillary parts. For instance, when teeth such as those shown in the enlarged views 112 and 116 in FIG. 1 are not replaced, but instead are allowed to fail, a mill to which the teeth are attached may begin to wear or otherwise deteriorate. In this example, replacing or repairing the mill is much more expensive, both financially and in terms of machine downtime, than properly replacing the worn part 120 with a new part 118. Moreover, using parts that are not excessively worn or spent can complete tasks more quickly than with worn, broken, and/or missing parts.

One having ordinary skill in the art will appreciate the computer programs for implementing the disclosed techniques may be stored on and/or read from computer-readable storage media. The computer-readable storage media may have stored thereon computer-executable instructions which, when executed by a processor, cause the computer to perform, among other things the processes disclosed herein. Exemplary computer-readable storage media may include magnetic storage devices, such as a hard disk, a floppy disk, magnetic tape, or other magnetic storage device known in the art; optical storage devices, such as CD-ROM, DVD-ROM, or other optical storage devices known in the art; and/or electronic storage devices, such as E PROM, a flash drive, or another integrated circuit storage device known in the art. The computer-readable storage media may be embodied by one or more components of the environment 100.

It will be apparent to those skilled in the art that various modifications and variations can be made to the disclosed payload overload control system without departing from the scope of the disclosure. Other embodiments will be apparent to those skilled in the art from consideration of the specification and practice of the embodiments disclosed herein. It is intended that the specification and examples be considered as exemplary only, with a true scope of the disclosure being indicated by the following claims and equivalents thereof.

What is claimed is:

1. A system, comprising:
one or more processors; and
computer-readable media storing instructions that, when executed, cause the one or more processors to perform acts comprising:
receiving information associated with a wear surface of a part;
sending the information associated with the wear surface of the part to a wear processing system;
receiving, from the wear processing system, the wear processing system having determined based at least in part on the information and a wear model trained to identify a wear status, that the part should be replaced, an indication that the part should be replaced;
causing a notice indication to be displayed indicating that the part should be replaced;
causing the part to move to a replacement orientation for replacement; and
causing an indication to be visible to an operator indicating which part of a plurality of parts is the part that should be replaced.

2. The system of claim 1, wherein the causing the part to move to a replacement orientation for replacement includes causing movement of an assembly containing the part to a position to allow the part to be removed by the operator.

3. The system of claim 2, wherein the part comprises one or more of a tooth, a pick, a bit, a tool holder, or a combination thereof, and wherein causing movement of the assembly includes rotating a mill assembly drum to move the one or more of a tooth, a pick, a bit, or a combination thereof to the replacement orientation.

4. The system of claim 1, wherein the causing the part to move to the replacement orientation for replacement includes, receiving an input from the operator indicative of a request to move the part to the replacement orientation; and based at least in part on the input, causing movement of an assembly containing the part to a position to allow the part to be replaced by the operator.

5. The system of claim 1, wherein the causing the indication to be visible to the operator indicating which part of the plurality of parts is the part that should be replaced includes one or more of:
causing a laser diode to project a beam of visible light onto a portion of the part;
causing a device to display an indicator in an overlay on an optical element in a field of view of the operator augmenting an operator's real world view of the real world; or
causing a device to display an image illustrating the part installed and an indicator referencing the part.

6. The system of claim 1, further comprising:
an optical sensor configured to capture one or more images of the part; and
wherein receiving information associated with the wear surface of the part includes receiving the one or more images captured by the optical sensor.

7. The system of claim 1, wherein the receiving an indication that the part should be replaced includes receiving an indication that a second part of the plurality of parts should be replaced.

8. The system of claim 7, further comprising:
causing a second notice indication to be displayed indicating that a second part should be replaced;
causing the second part to move to the replacement orientation for replacement; and
causing a second indication to be visible to the operator indicating which part of the plurality of parts is the second part that should be replaced.

9. The system of claim 8, wherein the causing the second part to move to the replacement orientation for replacement includes causing movement of an assembly containing the second part to a second position to allow the second part to be removed by the operator.

10. A computer-implemented method comprising:
receiving information associated with a wear surface of a part;
sending the information associated with the wear surface of the part to a wear processing system;
receiving, from the wear processing system, the wear processing system having determined based at least in part on the information and a wear model trained to identify a wear status, that the part should be replaced, an indication that the part should be replaced;
causing a notice indication to be displayed indicating that the part should be replaced;
causing the part to move to a replacement orientation for replacement; and
causing an indication to be visible to an operator indicating which part of a plurality of parts is the part that should be replaced.

11. The computer-implemented method of claim 10, wherein the causing the part to move to the replacement orientation for replacement includes causing movement of an assembly containing the part to a position to allow the part to be removed by the operator.

12. The computer-implemented method of claim 11, wherein the part comprises one or more of a tooth, a pick, a bit, a tool holder, or a combination thereof, and wherein the causing movement of the assembly includes rotating a mill assembly drum to move the one or more of a tooth, a pick, a bit, a tool holder, or a combination thereof to the replacement orientation.

13. The computer-implemented method of claim 10, wherein the causing the part to move to the replacement orientation for replacement includes, receiving an input from the operator indicative of a request to move the part to the replacement orientation; and based at least in part on the input, causing movement of an assembly containing the part to a position to allow the part to be replaced by the operator.

14. The computer-implemented method of claim 10, wherein the causing the indication to be visible to the operator indicating which part of the plurality of parts is the part that should be replaced includes one or more of:
causing a light source to project a beam of visible light onto a portion of the part;
causing a device to display an indicator in an overlay on an optical element in a field of view of the operator augmenting an operator's real world view of the real world; or
causing a device to display, an image illustrating the part installed and an indicator referencing the part.

15. The computer-implemented method of claim 10, wherein the receiving an indication that the part should be replaced includes an indication that a second part of the plurality of parts should be replaced.

16. The computer-implemented method of claim 15, further comprising:
causing a second notice indication to be displayed indicating that a second part should be replaced;
causing the second part to move to the replacement orientation for replacement; and
causing a second indication to be visible to the operator indicating which part of the plurality of parts is the second part that should be replaced.

17. The computer-implemented method of claim 16, wherein the causing the second part to move to the replacement orientation for replacement includes causing movement of an assembly containing the second part to a second position to allow the second part to be removed by the operator.

18. A road milling machine, comprising:
a part having a wear surface;
one or more processors; and
computer-readable media storing instructions that, when executed, cause the one or more processors to perform acts comprising:
receiving information associated with the wear surface of the part;
sending the information associated with the wear surface of the part to a wear processing system;
receiving, from the wear processing system, the wear processing system having determined based at least in part on the information and a wear model trained to identify a wear status, that the part should be replaced, an indication that the part should be replaced;
causing a notice indication to be displayed indicating that the part should be replaced;
causing the part to move to a replacement orientation for replacement; and
causing an indication to be visible to an operator indicating which part of a plurality of parts is the part that should be replaced.

19. The road milling machine of claim 18, wherein the causing the part to move to a replacement orientation for replacement includes causing movement of an assembly containing the part to a position to allow the part to be removed by the operator.

20. The road milling machine of claim 18, wherein the causing the indication to be visible to the operator indicating which part of the plurality of parts is the part that should be replaced includes one or more of:
causing a light source to project a beam of visible light onto a portion of the part;
causing a device to display an indicator in an overlay on an optical element in a field of view of the operator augmenting an operator's real world view of the real world; or
causing a device to display, an image illustrating the part installed and an indicator referencing the part.

* * * * *